United States Patent [19]
Mehnert et al.

[11] 4,456,817
[45] Jun. 26, 1984

[54] CIGAR LIGHTER

[75] Inventors: Walter Mehnert; Hans J. Köllner, both of Ottobrunn; Helmut Tönnes, Eglharting, all of Fed. Rep. of Germany

[73] Assignee: PEBRA GmbH Paul Braun, Altbach, Fed. Rep. of Germany

[21] Appl. No.: 377,688

[22] Filed: May 13, 1982

[30] Foreign Application Priority Data

May 22, 1981 [DE] Fed. Rep. of Germany ....... 3120457
Dec. 17, 1981 [DE] Fed. Rep. of Germany ....... 3150090

[51] Int. Cl.³ .............................................. F23Q 7/22
[52] U.S. Cl. .................... 219/263; 219/262; 219/267; 219/269; 200/5 A
[58] Field of Search ............... 219/260, 261, 262, 263, 219/264, 265, 267, 268, 269, 270, 543; 361/264, 265, 266; 200/5 A

[56] References Cited

U.S. PATENT DOCUMENTS

| 2,134,462 | 10/1938 | Powell | 219/267 |
| 2,932,717 | 4/1960 | Beattie | 219/266 X |
| 3,251,979 | 5/1966 | Taylor | 219/268 |
| 3,471,679 | 10/1969 | Ohnborn | 219/269 |
| 3,560,705 | 2/1971 | Mendenhall | 219/265 |
| 4,228,329 | 10/1980 | Inose et al. | 200/5 A |
| 4,230,931 | 10/1980 | Horwitt et al. | 219/267 X |
| 4,270,038 | 5/1981 | Warihashi | 219/269 |

FOREIGN PATENT DOCUMENTS 1802931 10/1968 Fed. Rep. of Germany .
2099122 12/1982 United Kingdom ............... 219/269

Primary Examiner—Volodymyr Y. Mayewsky

[57] ABSTRACT

A cigar lighter, particularly for motor vehicles, comprising a plug body, which is insertable into a socket provided with current supply connections and in which an electrical heating element is mounted. An actuating device for switching current on, an indicator for indicating the operational state and a control device for automatically switching the heating process off is provided.

40 Claims, 7 Drawing Figures

FIG.1

CIGAR LIGHTER

BACKGROUND OF THE INVENTION

The present invention relates to a cigar lighter for use in vehicles or the like.

German publication DE-P.S. No. 1802931 discloses an electrical lighter having a plug body formed of an outer sleeve shell removably insertable in a cylindrical socket which is fixedly secured in the dashboard of the vehicle. Slidably located in the outer sleeve is an inner sleeve shell and a heating element comprising a spiral resistance coil, located in a cup, mounted on one end of a central post, the other end of the post being attached to an insulating knob fixed to the inner sleeve. The post is centered within the outer sleeve shell by a fixed bracket through which the center post freely passes. A helical compression spring located between the fixed bracket and the knob biases the inner sleeve normally outward from the outer sleeve. In use, the outer sleeve is insertable into the socket, which is provided with a central hub constituting a first electrical terminal, and a plurality of bimetal latch spring fingers arranged to grasp the heating coil cup about its periphery constituting the second electrical terminal. After insertion of the outer sleeve, into the socket, the knob is depressed pushing the heating element to engagement with the bimetal latch fingers and the central hub, completing the circuit through the heating coil. When the coil heats the bimetal latch fingers, they become hot, distend, and release the cup allowing the entire plug body to pop outwardly. After release has taken place, the heating element together with the knob is automatically moved outward relative to the outer sleeve under the effect of the helical spring so that the knob protrudes so far out of the socket, beyond the dashboard, that it can be gripped and the entire plug body can be pulled out of the socket for use.

In such a cigar lighter, current is switched on when the knob is pressed in and the connection to the vehicle battery is produced. At the same time, an induction of the operational state is made, since the knob remains in its pressed-in position until the coil and cup is released by the bimetal latches operating as a control device after attainment of the desired heating temperature. In that case, the knob and entire heating element jumps under the effect of the spiral spring so far out of the socket that an indication of the readiness for use of the heated cigar lighter is provided.

It is a disadvantage in such a cigar lighter that a plurality of parts is requied, which in operation are movable one relative to the other, so that faults can eventually result due to wear. In particular, the possibility exists that the current supply contacts with socket and coil can become welded together preventing the release of the bimetal latches and the interruption of the contact to the vehicle battery, so that the helical spring is no longer in a position of breaking the contact and poping the lighter. Overheating of the coil can thus set in, leading to destruction of the coil as well as to cause heat damage to those parts arranged in proximity to the lighter on the dashboard. Beyond that, it is possible that the knob, after release by the bimetal latches is instantly thrown back into the removal position under the influence of the spiral spring so that the resultant high acceleration forces are produced on the heated coil, appreciably reducing its life. Although it is known to damp these shocks on the coil by elastic buffers, additional mechanical parts are however required for this; moreover such parts cannot assure the complete elimination of shock on the coil.

The problem forming the basis of the present invention thus consists in further developing a cigar lighter of the initially named kind in the sense that, to increase the reliability of use, mechanically moved parts are largely avoided and shock to the coil is excluded in operation.

SUMMARY OF THE INVENTION

According to the invention, this problem is solved thereby, in that the control device is constructed as an electronic control circuit rather than as a mechanical control mechanism. According to the invention, it is possible to construct the cigar lighter as a unitary body without any mutually movable parts, which during the switching-on and the heating-up is held completely immovable in the socket. Only during actual use to light a cigarette and only after heating-up has taken place, is the entire body pulled out of the socket and thereafter plugged in again. Wear on the moving parts and shock on the coil in the heated-up state are thereby excluded, according to invention.

A particular advantage of the present invention lies in the fact that the electronic control circuit makes possible a very reliable monitoring of the heating process and securely prevents the welding fast of current-conducting contacts, since a separation of the current supply contacts between the socket and the body takes place only after the control circuit has already interrupted the current flow. Additionally, the electronic control circuit with little effort permits a monitoring of the maximum temperature of the resistance coil so that an overheating through misusing repeated switching-on is impossible.

Particularly preferred embodiments and developments of the cigar lighter according to the invention will be obvious from the following description of the invention.

BRIEF DESCRIPTION OF THE DRAWINGS

In the drawings:

FIG. 1 is a sectional view representing the mechanical construction of a cigar lighter according to the invention.

DESCRIPTION OF THE INVENTION

Figure 1:
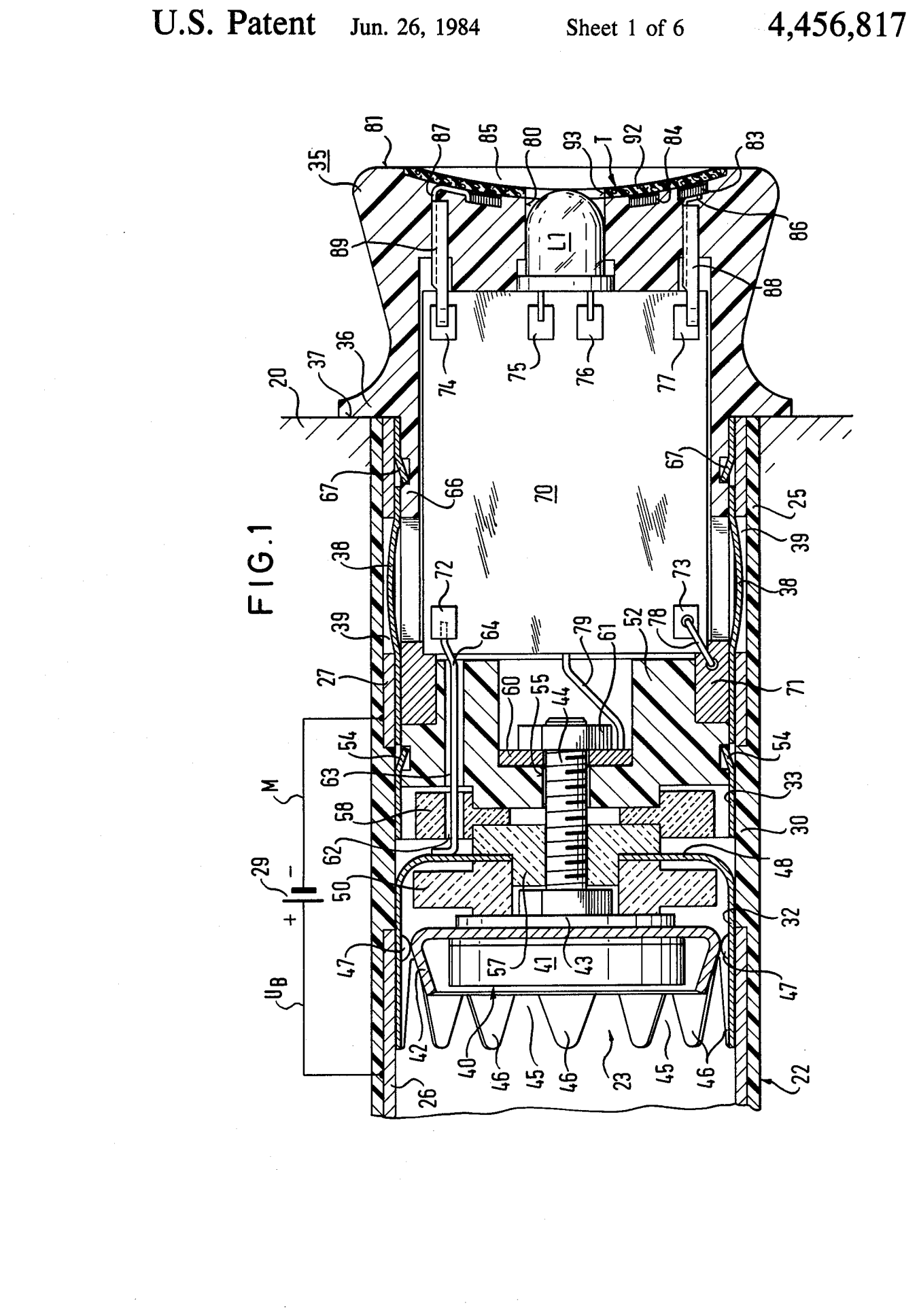
Figure 2:
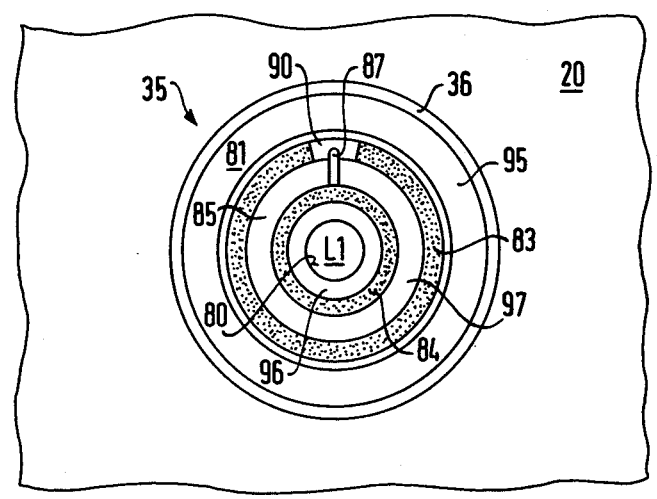
FIG. 2 is a front elevation, seen from the right of the lighter according to FIG. 1, wherein the circular disc of electrically conducting elastomeric material is omitted for better illustration of the key switch.

The cigar lighter illustrated in FIG. 1 possesses two main components, namely a socket 22 firmly installed, for example, into the dashboard 12 of a motor vehicle and a plug body 23 insertable into the socket and withdrawable from it for use.

The socket 22 in the present case comprises a hollow cylinder 25, which consists of synthetic material and which is so built into the dashboard 20 that its one open end face lies approximately in a plane with the surface of the dashboard. The internal wall of the hollow cylinder 25 is lined by two metallic cylindrical sections 26 and 27, which are axially spaced one from the other. The forward section 26 (in plugging direction i.e. the cylinder section at the left in FIG. 1), is connected to the positive pole of the car battery 29 and the rear cylinder section 27 (in plugging direction) is connected to the negative pole of the car battery 29, as is indicated symbolically in FIG. 1. The cylinder sections 26 and 27 have the same internal diameter and are separated one from the other by an inwardly protruding annular projection 30 of the hollow cylinder 25. The axial length of the projection 30 is so chosen that no short-circuit can arise on the extraction and/or insertion of the plug body 23. The internal diameter of the projection 30 corresponds to the internal diameter of the cylinder sections 26 and 27 so that the socket 22 has a smooth internal surface making possible a simple insertion and/or extraction of the plug body 23.

The plug body 23 comprises three sections clearly spaced one from the other, namely a pair of metallic sleeves 32 and 33, which have about the same external diameter, which are arranged axially spaced one behind the other and which together form the part of the body 23 pushable into the socket 22, and; a knob 35, which fits at one end into the rear of the metallic sleeve 33 and has a radially outward shoulder 36, the external diameter of which is greater than the internal diameter of the socket 22 forming an abutment surface 37 limiting the maximum insertion depth of the plug body 23 into the socket 22.

The axial lengths and the external diameters of both the sleeves 32 and 33 are so dimensioned that with the plug body 23 fully inserted the forward sleeve 32 is in electrically conducting connection with the forward cylinder section 26 and the rear sleeve 33 is in contact with the rear cylinder section 27.

In order to improve the electrical contact of the rear sleeve 33 with the cylinder section 27, and at the same time to assure it a firm seat, not being loosened even in case of forceful shock to the arrangement, the rear sleeve 33 is provided with several stamped-out and outwardly bowed spring webs or spring fingers 38, which detent in corresponding recesses 39 formed in the rear cylinder section 27, when the plug body 23 is plugged in completely. The retaining force exerted by the fingers 38 is so set that its bias can readily be overcome on the intentional extraction of the plug body 23 out of the socket 22.

The forward sleeve 32, which is open at its front end face, i.e. to the left in the FIG. 1, is formed in the manner of a shell to surround a heating element 40, which in the present case comprises a generally known resistance coil 41, fixedly mounted in a cup 42. The outer end of the coil 41 is welded to the cup 42 which forms one of the two current connections. The inner end of the coil 41 is connected to a threaded pin 44 which extends, electrically insulated, through the bottom 43 of the cup 42 and which serves to assemble the entire heating element 40. The pin 44 forms the second current connection for the coil 41.

The heating element 40 is so arranged in the forward sleeve 32 that the threaded pin 44 extends in direction of the longitudinal axis of the plug body 23 and thereby of the entire arrangement, and that the forward surface of the coil 41, which serves for the lighting of a cigar or a cigarette, is accessible from the open front of the forward sleeves 32 when the plug body 23 is pulled out.

The forward sleeve 32 extends so far in the axial direction beyond the forward end face of the heating element 40 that the surface of the coil 41 even when hot is largely covered against an unintended touching injury, for example, damage to the vehicle seat or the vehicle carpet bottom, cannot arise even when the plug body 23 unintentionally falls out of the hand of the user.

To be able to light pipes with the cigar lighter according to the invention, even though it does not have any kind of mutually movable parts and in spite of the over lapping lateral covering of the coil 41 by the safety sleeve 32, the forward part of the sleeve 32 is divided by approximately triangular notches 45, extending axially rearwards from the forward edges. This provides individual prongs 46, which readily let themselves be pushed into the tobacco of a stuffed pipe until the tobacco touches the glowing surface of the coil 41 without the tobacco being compressed in an undesired manner.

For the attainment of a good electrical contact between the cup 42, serving as one current connection, and the forward cylinder section 26 of the socket 22, the prongs 46 are on the one hand so bent relative to the longitudinal axis that, although their tips lie on a circle, the diameter of which is somewhat smaller than the internal diameter of the cylinder sections 26 and 27, respectively, the regions lying close to the base of the prongs have a greater external diameter. In this manner the prongs 46 freely enter the socket but are resiliently compressed during the insertion of the plug body 23 into the socket 22 to thereby bear resiliently against the forward cylinder section 26. In addition, at least some of the prongs 46 are provided with noselike projections 47, which point inwardly from their inner surfaces and which are so positioned in the axial direction that they are pressed against the external wall of the cup 42 when the plug body 23 is inserted.

The forward sleeve 32 is bent radially inwardly approximately at right angles to the longitudinal axis so that it forms a bottom section 48, having a central opening which allows the contactless passing-through of the threaded pin 44.

A first annular washer 50 of a heat-insulating material, for example ceramic, which largely inhibits the heat transfer from the heating element 40 to the forward sleeve 32, is inserted between the bottom section 48 of the forward sleeve 32 and the bottom 43 of the cup 42. This insulation is attained particularly by forming the annular washer 50 at both its end faces with shoulders of a stepped shape so that on the one hand it is in contact through smallest possible bearing surfaces with the bottom 43 of the cup 42 as well as with the bottom section 48 of the forward sleeve 32 and on the other hand protrudes as far as possible outwardly in the radial direction in order to screen the bottom section 48 as far as possible from the heat radiation emanating from the cup 42.

The forward sleeve 32, the heating element 40 and the annular washer 50 are connected with the rest of the plug body 23 through the threaded pin 44 protruding rearwardly from the bottom 43 of the cup 42. A carrier 52, the external diameter of which is about equal to the internal diameter of the rear sleeve 33 is fastened in the rearward sleeve 33 by detent connections 54 of which two are illustrated in FIG. 1. The carrier 52 is inserted in the forward end region of the rearward sleeve 33 and possesses substantially the shape of a right circular cylinder having a stepped central bore 55, open at both end faces. The central bore 55 serves to freely receive the threaded pin 44, for which the internal diameter of this bore 55 is advantageously somewhat greater than the external diameter of the threaded pin 44 so that no contact between both these parts is present here. Thereby, in spite of the face that the threaded pin 44 is also heated during the heating of the coil 41, the carrier 52 can readily be made of synthetic material, which leads to appreciable cost reduction compared with a corresponding ceramic body.

Inserted between the carrier 52 and the bottom section 48 of the forward sleeve 32 are two further annular washers 57 and 58 of heat-insulating material, for example ceramic, which serve not only to insulate in terms of heat, but also to separate both the sleeves 32 and 33 electrically one from the other. Both the annular washers 57 and 58 are so provided with centering shoulders that an exact axial alignment of the forward sleeve 32 and the parts received in it with the rearward sleeve 33 is attained in the assembled state. For this purpose, the forward annular washer 57 possesses a central bore, the internal diameter of which is exactly matched to the external diameter of the threaded pin 44. The forward annular washer 57 is on the one hand centered with respect to the longitudinal axis of the plug body 23 by the rearward annular washer 58 centered on the carrier 52 and in its turn centers the forward sleeve 32 through the central opening, which is provided in the bottom section 48 thereof, as well as the first annular washer 50 placed in between this bottom section and the bottom of the cup 42.

The just described parts are assembled, by first placing the first annular washer 50, then the forward sleeve 32, the second annular washer 57, the third annular washer 58, the carrier 52, an annular washer of heat-insulating material, not illustrated in the Figure, as well as a metallic contact ring 60 in turn onto the threaded pin 44 and screwed together by a nut 61. Whereupon, the carrier 52 can be pushed from the front side into the rearward sleeve 32 until the detent connections 54 notch in so that the sleeves 32 and 33 and the individual parts associated therewith are firmly joined one with the other in exact axially alignment.

In place of the separate annular washers 57 and 58, a single, appropriately shaped annular washer can also be employed. Although the number of the required individual parts is thus reduced, it may be peferred however, to use two annular washers since they afford the advantage that a further contact surface is provided which can for example be roughened or provided with grooves or the like in order to form as poor as possible surface for heat transfer.

The rearward annular washer 58 and the carrier 52 each are provided with a respective bore 62 and 63, which extend parallel to the axis, and which are in alignment one with the other, through which extends an electrical conductor 64, which at one end is in conducting connection with the forward sleeve 32.

The end of the knob 35 which is inserted into the sleeve 33 is in the form of an integral shank 66 having an external diameter corresponding to the internal diameter of the sleeve 33. This shank 66 is assembled by forcing it into the rearward open end of the sleeve 33 and it is held there with the air of detent connections 67, of which two are illustrated in FIG. 1. The shank 66 as well as the largest part of the area of the knob 35 adjoining it are constructed to be hollow so that here in the interior of the plug body 23, a free space is formed which serves to receive a substrate or circuit board 70 carrying the electronic control circuit. The circuit board 70 is supported by a bracket 71.

The circuit board 70 is illustrated schematically in FIG. 1 only as simple plate with six dot terminals 72 to 77. In reality, this board 70 carries nearly all components of the electronic circuit still to be described further below, which are mounted on it for example with the aid of the known thick layer technique.

Since the electronic control circuit must be connected to the car battery 29, a conductor 64 is conductingly connected with the terminal 72, whereby the positive supply voltage is fed to the electronic control circuit. The ground connection is made through the terminal 73, which is connected by a conductor 78 with the bracket 71, which consists of metal and which in its turn is in connection through the metallic rear sleeve 33 and the metallic rear cylinder section 27 of the socket 22 with the negative pole of the car battery 29 and from the circuit board 70, through a lead 79 into contact with the ring 60 holding the pin 44.

Starting from the contact ring 60, the conductor 79 extends to a power transistor V2 (FIG. 3), which is arranged below the circuit board 70 and therefore not visible in the FIG. 1 and which is driven by the electronics disposed on the board 70. To avoid overheating of the circuit board the transistor V2 is not mounted on the board, but on the brakcet 71. The bracket 71 at the same time serves as cooling body.

On the side of the circuit board 70 to the right in FIG. 1, i.e. rearwardly in the plugging direction, is fastened a luminescent diode L1 serving as an indicating device for the operational state of the cigar lighter. Both connecting wires of the diode L1 are soldered to the terminals 75 and 76, which are in connection through corresponding conductor tracks (not illustrated in FIG. 1) with the electronic control circuit so that the luminescent diode L1 can be driven. The luminescent diode L1 projects from the front of the knob 35 in a central bore 80 in the end face 81, facing the user, so that it is well visible for the user.

As is particularly evident from FIG. 2, a key switch T for switching-on the current for the coil 41 is arranged on the end face 81 and comprises two substantially circular metallic contacts 83 and 84 which are arranged concentrically around the bore 80. Both the metallic contacts 83 and 84 are so inserted into corresponding grooves, which are formed in the bottom of a circular depression 85 machined concentrically in the rearward end face 81, that their surface lies slightly lower than the radially outwardly and inwardly disposed bottom regions 95 and 96, respectively, of the depression 85. The web 97 disposed between the grooves holding the contacts 83 and 84 is bevelled somewhat so its end face lies lower than the bottom regions 95 and 96 and is thus disposed at about the same level as the end face of both the contacts 83 and 84. Each of both the circular contacts 83 and 84 is connected through conductors 86 and 87 with a metallic spring element 88 and 89, respectively. The spring elements 88 and 89 project forwardly into the hollow space receiving the circuit board 70 that, in the assembled state, it stands in a resilient, electrically conducting engagement with the associated terminals 77 and 74, respectively. Thus the key switch T is connected with the electronic control circuit of the cigar lighter according to the invention.

Alternatively, in place of the spring elements 88 and 89, other conductors, for example wires, can also be provided, which are soldered to or electrically connected in other manner with the terminals 77 and 74, respectively.

The outer contact 83 on the key switch T does not form a closed circle, but is provided with a gap 90 (see particularly FIG. 2), which makes it possible to arrange the hole in the knob 35 for the spring element 89 on the same radius as the hole for the spring element 88, whereby a greater symmetry and thereby a simpler manufacturability of the knob 35 is attained.

A circular flexible diaphragm 92 of an electrically conducting elastomeric material, for example a silicone rubber or the like made electrically conductive, is laid into the depression 85. The diaphragm 92, which possesses a central passage opening 93 for the luminescent diode L1, can be matched diametrically so exactly to the dimensions of the depression 85 that it is held in this depression as in a force fitting seat. If required, it can however also be fastened by an adhesive substance or the like to the peripheral edge.

It is important merely that the diaphragm 92 in the rest state does not touch both contacts 83 and 84 simultaneously so that no conducting connection exists between both these contacts. For the actuation of the key switch T, it suffices to lightly touch the diaphragm 92 with the finger, whereby it is depressed so far that it touches both the contacts 83 and 84 and connects them conductingly one with the other. Thereby, the electronic control device disposed on the circuit board 70 is so actuated that it switches on the heater current for the coil 41, as will be described.

Figure 3:
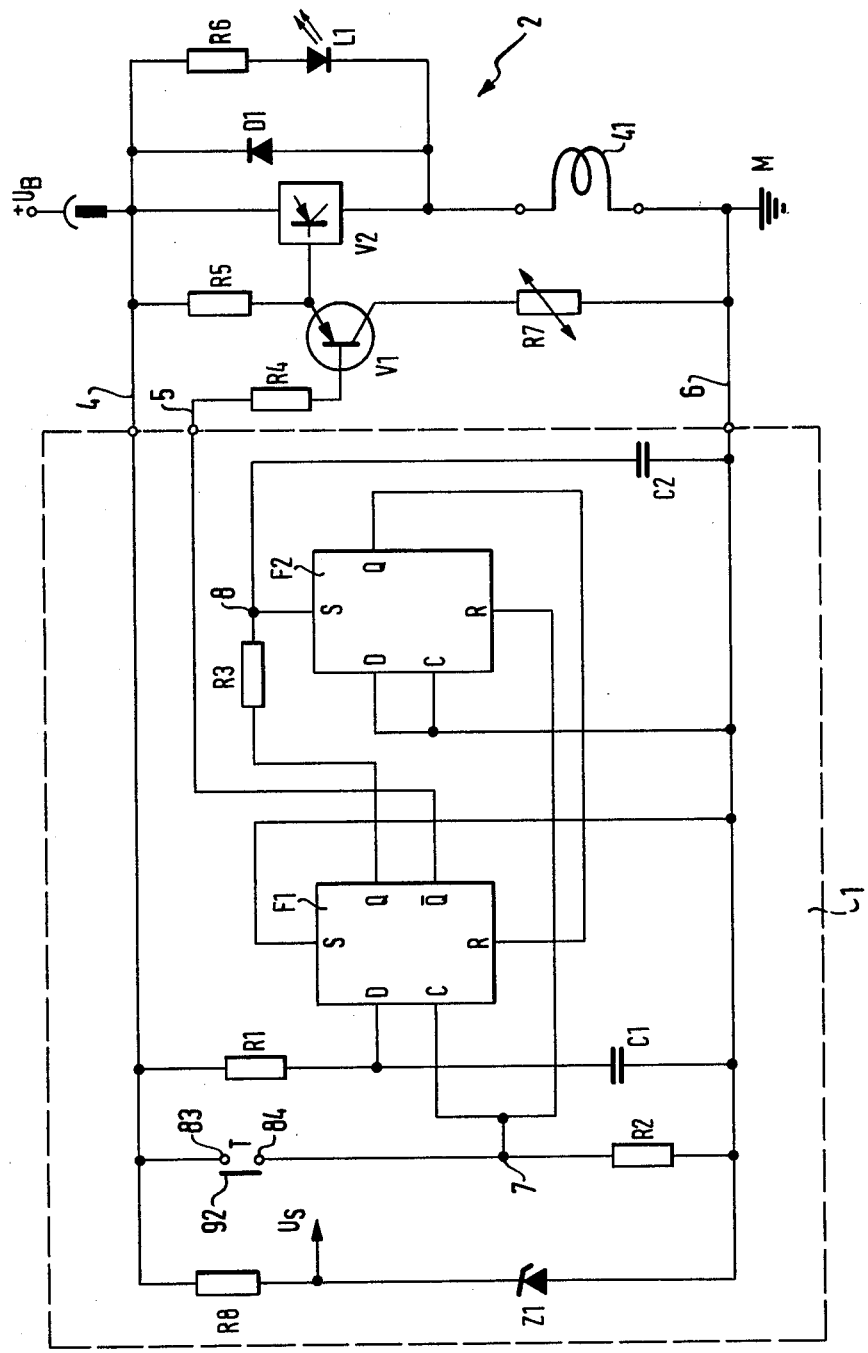
FIG. 3 is a schematic circuit diagram of an electronic control circuit showing a first embodiment of the timing circuit and a first embodiment of the driver circuit.

The electronic control circuit illustrated in FIG. 3, as already mentioned, is housed in the interior of the plug body 23 and connected through the sleeves 32 and 33 thereof with the current supply connections of the socket 22. It comprises basically a timing circuit 1 framed within the dashed line of the FIG. 3 as well as a driver circuit 2, which is illustrated in the righthand part of the FIG. 3 and which is connected with the coil 41. The luminescent diode L1 serves not only as indicating element but, together with the forward cylinder section 26, forms the current supply connection from $U_B$ while the rearward cylinder section 27 of the socket 22 forms the ground connection M.

This first embodiment, illustrated in the FIG. 3, of the timing circuit 1 comprises two D-flip-flops F1 and F2, which together are accommodated as integrated circuits on a chip. The current supply of the timing circuit takes place through the lines 4 and 6, which are connected one with the other through a series circuit of a resistor R8 and a Zener diode Z1. A stabilized supply voltage $U_S$ for both the flip-flops F1 and F2 is disposed at the junction of the resistor R8 and the Zener diode Z1. For the sake of simplicity, the corresponding connecting lines of this supply voltage $U_S$ have been omitted in the drawing.

The data input D of the flip-flop F1 is connected on the one hand through a resistor R1 and the line 4 with the positive current supply connection $U_B$ and on the other hand through a capacitor C1 and the line 6 with the ground connection M.

The clock input C of the flip-flop F1 lies at the junction 7 of a series circuit of the key switch T connected at one side with the line 4 and a resistor R2 connected at one side with the ground line 6. Furthermore, the junction 7 is connected with the resetting input R of the flip-flop F2. The setting input S of the flip-flop F1 lies directly at the ground line 6, while its resetting input R is connected with the Q-output of the flip-flop F2. The $\overline{Q}$-output of the flip-flop F1 is connected through the line 5 and a resistor R4 with the base of a driver transistor V1 to drive the driver circuit 2. From the Q-output of the flip-flop F1, a series connection, forming a timing member, comprising a resistor R3 and a capacitor C2 leads to the ground line 6. The junction 8 of the resistor R3 and the capacitor C2 is connected with the setting input S of the flip-flop F2.

The data input D as well as the clock input C of the flip-flop F2 are connected with the ground line 6 so that the flip-flop F2 operates as setting-resetting flip-flop. Preferably, both the flip-flops F1 and F2 are constructed as integrated MOS-circuits.

The inputs of these MOS-circuits are of extraordinarily high resistance. Therefore, the elastomeric material, of which the diaphragm 92 serving to electrically bridge the contacts 83 and 84 can possess a comparably low electrical conductivity. It has proved that film material mats, such as are employed for the packaging of integrated MOS-blocks, can be used to particular advantage here, to provide a low conductivity in order to protect the inputs, sensitive to overvoltages, of those components against electrostatic discharge.

The driver circuit 2, illustrated in the righthand part of the FIG. 3, comprises a PNP driver transistor V1, the base connection of which is driven through the resistor R4 at the line 5 from the $\overline{Q}$-output of the flip-flop F1 of the timing circuit 1. The collector of the driver transistor V1 is connected through a PTC resistor R7 with the ground line 6, while its emitter connection is connected through a resistor R5 with the positive supply line 4 and thereby with the current supply $U_B$. The emitter connection of the driver transistor V1 is connected with the control electrode of an electronic power switch V2. Preferably, this electronic power switch V2 consists of a PNP Darlington power transistor; alternatively, in place thereof, a V-MOS transistor could also be employed. The emitter of the power switch V2 is connected directly with the positive current supply line 4, while its collector is connected through the coil 41 as load to the ground line 6. Connected in parallel with the switching path, i.e. to the emitter-collector path of the power switch V2, is a protective diode D1, which is poled in blocking direction and protects the power switch against voltage peaks during the switching process, which can result from the inductance of the coil 41. The luminescent diode L1 serving as indicating element is provided in series connection with a current-limiting resistor R6 likewise parallel to the switching path of the power switch V2.

Figure 6:
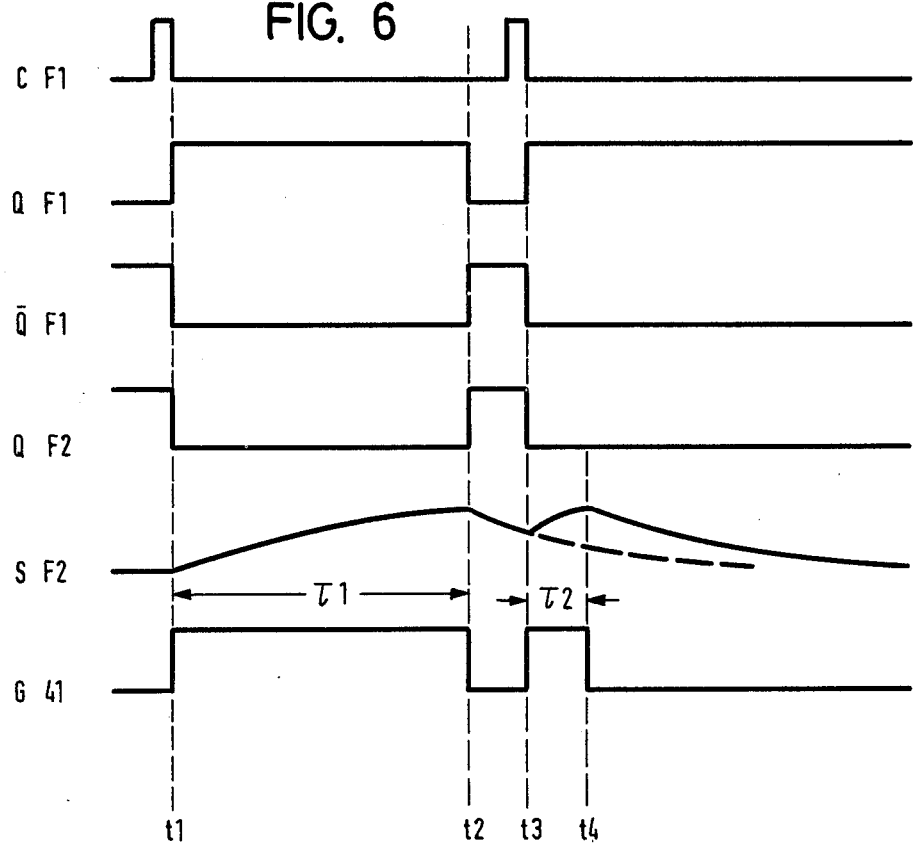
FIG. 6 is a pulse diagram relating to the embodiments according to the FIGS. 3 and 5, respectively.

The manner of function of the aforedescribed electronic control circuit is now explained in the following with reference to the FIG. 3 in conjunction with the signal diagram of the FIG. 6. The temporal signal courses at different points of the control circuit of the FIG. 3 are shown in schematic form in the signal diagram of the FIG. 6.

Let it first be assumed that the entire body 23 of the cigar lighter has been withdrawn from the socket 22 and the current supply connections and the heating element 40 has had time to cool down. When the body 23 is reinserted into the socket 22, the control circuit is connected with the positive current supply $U_B$ and the ground M in the manner described in conjunction with FIG. 1, whereby the flip-flops F1 and F2 are connected through the lines 4 and 6 on the one hand with ground and on the other hand through the series circuit of the resistor R8 and the Zener diode Z1 with the stabilized voltage $U_S$. At this instant, the capacitor C1 is discharged so that the data input D of the flip-flop F1 is approximately at ground potential, and the clock input C of the flip-flop F1 is likewise drawn to ground through the resistor R2. Thereby, the flip-flop F1 is reset in defined manner independently of its previous incidental circuit setting. The switch setting of the flip-flop F2 can be left as desired, since the flip-flop serves merely for resetting the flip-flop F1. At least, the Q-output of the flip-flop F1 is at a logic 0, while the $\bar{Q}$-output of this flip-flop F1 is at a logic 1. Thus, the base connection of the driver transistor V1 of the driver circuit 2 is drawn through the resistor R4 to the positive supply voltage so that the collector-emitter path is blocked and its emitter connection lies at about the potential of the positive supply voltage. This leads to the blocking of the power switch V2 so that no current is fed to the coil 41 and the entire supply voltage drops over the switching path of the power transistor V2. Thereby, the luminescent diode L1 lights up. The circuit is thus disposed in a state of readiness which endures as long as desired up to the actuation of the key switch T and is indicated by the lighting-up of the luminescent diode L1.

When, in this state of readiness, both the contacts 83 and 84 are connected one with the other by the depression of the diaphragm 92 of the key switch T, a positive pulse of the value logic 1, which sets the flip-flop F1, appears at the clock input of the flip-flop F1. This is illustrated at CF1 in the FIG. 6. As a result, the $\bar{Q}$-output of the flip-flop F1 goes to the level logic 0, corresponding to the ground potential, so that the base of the driver transistor V1 is driven. A voltage drop, which renders the electronic switch V2 conductive, arises at the emitter resistance R5 so that the heating coil 41 is supplied with current. At the same time, the voltage collapses at the switching path of the switch V2 so that the luminescent diode L1 extinguishes thereby indicating the heating state. Simultaneously, the flip-flop F2 is reset by the positive pulse on actuation of the key switch T. The Q-output of the flip-flop F1, now lying at the level logic 1, charges the hitherto discharged capacitor C2 through the resistor R3, as is indicated at SF2 in FIG. 6. This charging proceeds until the charge voltage at the capacitor C2, after the time interval $\tau 1$, attains the value logic 1, present at the setting input of the flip-flop F2. This sets flip-flop F2 so that the Q-output thereof goes to the value logic 1 resetting the flip-flop F1 so that the $\bar{Q}$-output thereof again assumes the value logic 1 and thus blocks the driver transistor V1. The power switch V2 is blocked and the current through the coil 41 is interrupted. The elapsed time from the actuation of the key switch T at the instant t1 up to the switching-off of the current at the instant t2, is a predetermined time interval $\tau 1$ given by the time constant of the RC-member R3 and C2. The coil is heated during this predetermined time interval, which is so dimensioned that the coil attains its normal ignition temperature for use. This is indicated to the user by the fact that the luminescent diode L1, previously extinguished on actuation of the key switch T, now again lights up by reason of the blocking of the power switch V2. The plug body of the cigar lighter can now be pulled out of the socket and used for the lighting of a cigarette, a cigar or a pipe. On reinserting the plug body into the socket after the use, the cigar lighter is again set into the state of readiness, as described above.

Reheating of the coil is prevented when the cigar lighter is not immediately withdrawn from the socket after the switching-off of the current at the instant t2. Should an attempt be made to renew actuation of the key, for example at the instant t3, then the capacitor C2 which is still disposed in a partially loaded state, as indicated at t3 in the pulse train SF2 in FIG. 6, heating is rapidly terminated. Although the flip-flop F1 in this state is again set by the key switch T and the heater current is switched on through the driver circuit 2, the renewed heating-up is quickly terminated at the instant t4, since only a very short time interval $\tau 2$ is needed in order to charge the capacitor C2 again to the level logic 1. This immediately sets again the flip-flop F2 so that the flip-flop F1 is again reset after the time interval $\tau 2$ and the heater current is interrupted. The aforedescribed function of the flip-flop F1 is thus in a certain sense "blocked" by this circuit arrangement until the capacitor C2 has been discharged completely after each heating process has taken place. In this manner, the possibility of over-heating the coil 41 and thereby of the entire cigar lighter is appreciably reduced even when the key switch T, is continuously misused.

In addition, the electronic control circuit can be equipped with means for further protection against over-heating. For this, as illustrated in FIG. 3, there is arranged, in the collector circuit of the driver transistor V1, a PTC resistor R7, which leads to ground and the resistance value of which rises with increasing temperature of the incandescent coil 41 or of the plug body of the cigar lighter in such a manner that the driver transistor V1 remains blocked even on being driven through the $\bar{Q}$-output of the flip-flop F1. A switching-on of the current through the electronic power switch V2 is therefore inhibited. The control circuit according to the invention thus affords on the one hand a reliable protection against misuse by multiple actuation of the key switch T and on the other hand also a direct monitoring of the maximum permissible temperature through the PTC resistor R7, which still prevents an over-heating even when, for example, a fault function occurs in the timing circuit 1.

Figure 4:
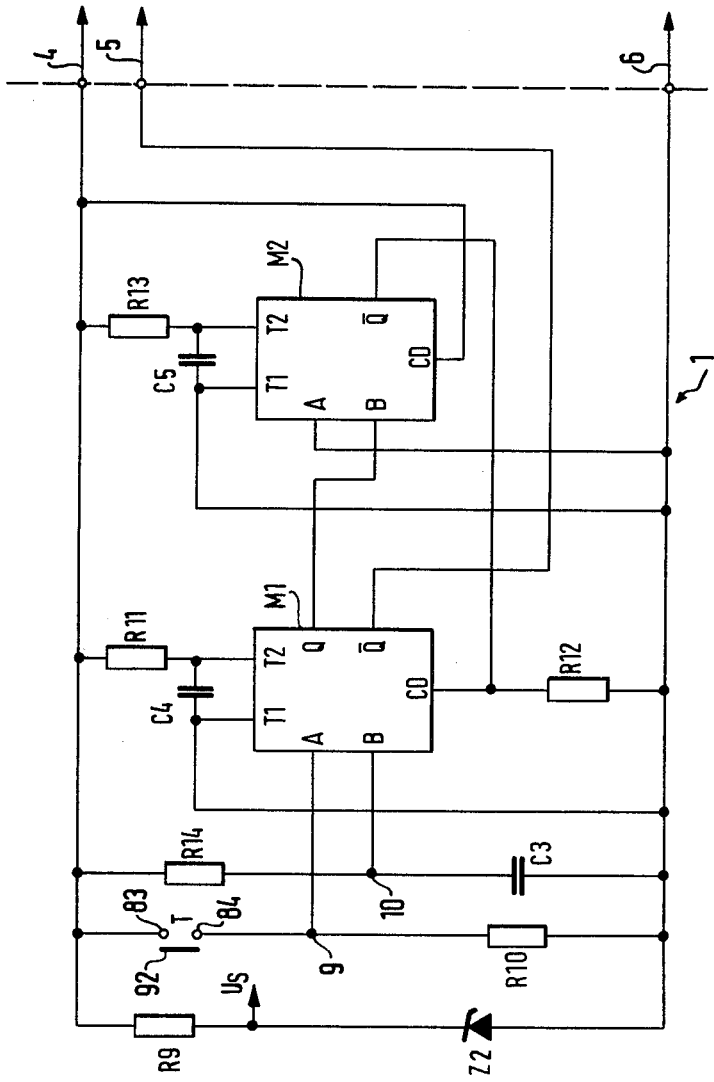
FIG. 4 is a schematic circuit diagram of a second embodiment of the timing circuit.

In FIG. 4, a further embodiment of the timing circuit 1 is described, which in place of the timing circuit of FIG. 3 can be connected through the lines 4, 5 and 6 with the driver circuit according to FIG. 3.

The timing circuit according to FIG. 4 is equipped with two monoflops M1 and M2, the stabilized supply voltage $U_S$ of which is supplied through the series connection of the resistor R9 and the Zender diode Z2 lying between the lines 4 and 6. As in FIG. 3, the supply voltage lines of the monoflops M1 and M2 were omitted in the drawing for the sake of simplicity. Both the monoflops M1 and M2 are each in conventional manner wired at their timing inputs T1 and T2 to a respective capacitor-resistance combination of C4 and R11 or C5 and R13 so that, after triggering, the monoflop M1 at its outputs delivers a pulse of the time duration $\tau 3$, while the monoflop M2 at its output delivers a pulse of the time duration τ4.

The B-input of the monoflop M1 is connected with the junction 10 of a series connection of a resistor R14 and a capacitor C3 connected between the supply lines 4 and 6. The A-input of the monoflop M1 lies at the junction 9 of the key switch T, connected on the other side with the positive supply line 4, and a resistor R10 connected on the other side with the ground supply line 6. Furthermore, the blocking input CD of the monoflop M1 is connected on the one hand through a resistor R12 with the ground line 6 and on the other hand connected directly to the Q-output of the monoflop M2. The Q-output of the monoflop M1 is present at the B-input of the monoflop M2, while its $\overline{Q}$-output drives the base of the driver transistor V1 of the driver circuit 2 (see FIG. 3) directly through the line 5 and the resistor R4. The A-input of the monoflop M2 is connected to ground and its blocking input CD is connected with the positive supply line 4 so that these inputs have no further influence on the manner of function.

Figure 7:
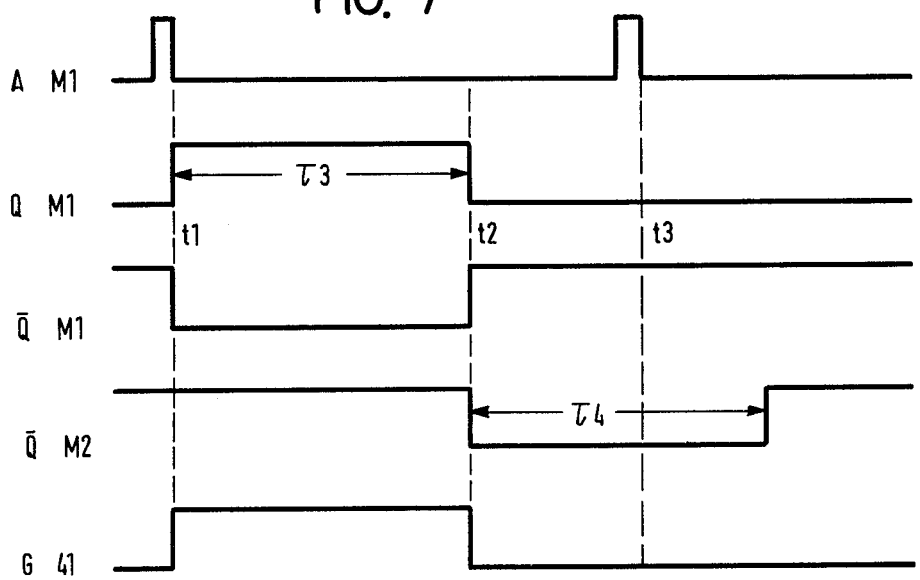
FIG. 7 is a pulse diagram relating to the embodiment according to FIG. 4.

The manner of operation of this other embodiment of a timing circuit 1 is now explained in the following with the aid of FIG. 4 with reference to the signal diagram of the FIG. 7.

It is again presupposed that the plug body 23 of the cigar lighter has initially been drawn out of the socket 22 for use and thereby been separated from the current supply. When the plug body 23 is now plugged into the socket 22 and the control circuit is thereby connected with the current supply, a logic 0-level is first applied to the B-input through the discharged capacitor C3 lying at ground as well as also to the A-input of the monoflop M1 through the resistor R10 lying at ground so that the monoflop M1 is brought into a defined reset state of readiness. In this state of readiness, the $\overline{Q}$-output of the monoflop M1 lies at a logic 1 level so that the driver circuit is held blocked through the line 5 and thus no current flows through the coil 41. In that case, the power switch V2 is blocked and the luminescent diode L1 indicates this state of readiness by lighting up.

If now, starting from this state of readiness, a positive pulse is applied at the instant t1 to the A-input of the monoflop M1 through actuation of the key switch T (see line AM₁ of FIG. 7), then the monoflop M1 is started so that its $\overline{Q}$-output drops to a logic 0-level which through the line 5 switches on the driver circuit so that the coil 41 is supplied with current. After an elapse of the predetermined time interval τ3, which is determined by the size of the capacitor C4 and of the resistor R11, the monoflop M1 drops back into its rest state at the instant t2, whereby its $\overline{Q}$-output again assumes a positive 1-level so that the driver circuit is blocked and the heater current through the coil 41 is switched off through the line 5. At the same time, at this instant t2, the Q-output of the monoflop M1 drops from the logic 1-level to the logic 0-level and thereby starts the monoflop M2 through the B-input thereof. The $\overline{Q}$-output of the monoflop M2 thereby falls to the logic 0-level and blocks the monoflop M1 through the blocking input CD thereof. The monoflop M2 remains in this state during the time interval τ4, which is determined by the values of the capacitor C5 and of the resistor R3. During this time interval τ4, the monoflop M1 is blocked for a further starting process. If thus on erroneous actuation of the key switch T after a heating process has already taken place, a start pulse is again applied to the A-input of the monoflop M1, then this start pulse remains ineffective, as this is illustrated in FIG. 7. Only after the elapse of the time interval 4, can the monoflop M2 again drop back into its rest state and free the blocking input of the monoflop M1. Heating is avoided, just as for the previously explained first embodiment of the timing circuit 1, even with repeated actuation of the key switch since the key switch remains ineffective. Thus an overheating of the coil and thereby of the entire arrangement is avoided. The additional protection against over-heating through the PTC resistor in the driver circuit 2 can be provided in the same manner as was described in conjunction with FIG. 3.

Concerning both of the just described examples of the timing circuit 1, it is to be pointed out that both of the RC-members R1 and C1 or R14 and C3 fulfill not only the function of resetting into a defined state of readiness, but also effect a filtering out of any interference on the supply lines 4 and 6 so that stray interference effects on these lines have no influence on the function of the timing circuits. A further embodiment of the timing circuit, lying within the scope of the invention, but not illustrated in the drawing, is based not on a predetermined time duration of the heating-up of the coil 41, but on a measurement of the temperature of the coil by a suitable temperature-dependent element, for example a PTC resistor or a NTC-resistor, a thermocouple or a bimetal strip. In that case, the temperature of the coil 41 is measured continuously from the start of the heating process until a predetermined value is attained and the driver circuit is thereupon switched off.

Also the driver circuit can be modified in various ways within the scope of the invention. For example, instead of the power switch V2 constructed as a Darlington transistor or as V-MOS transistor, a thyristor or a triac can be employed insofar as a current supply source of pulsating direct current or alternating current is available.

Figure 5:
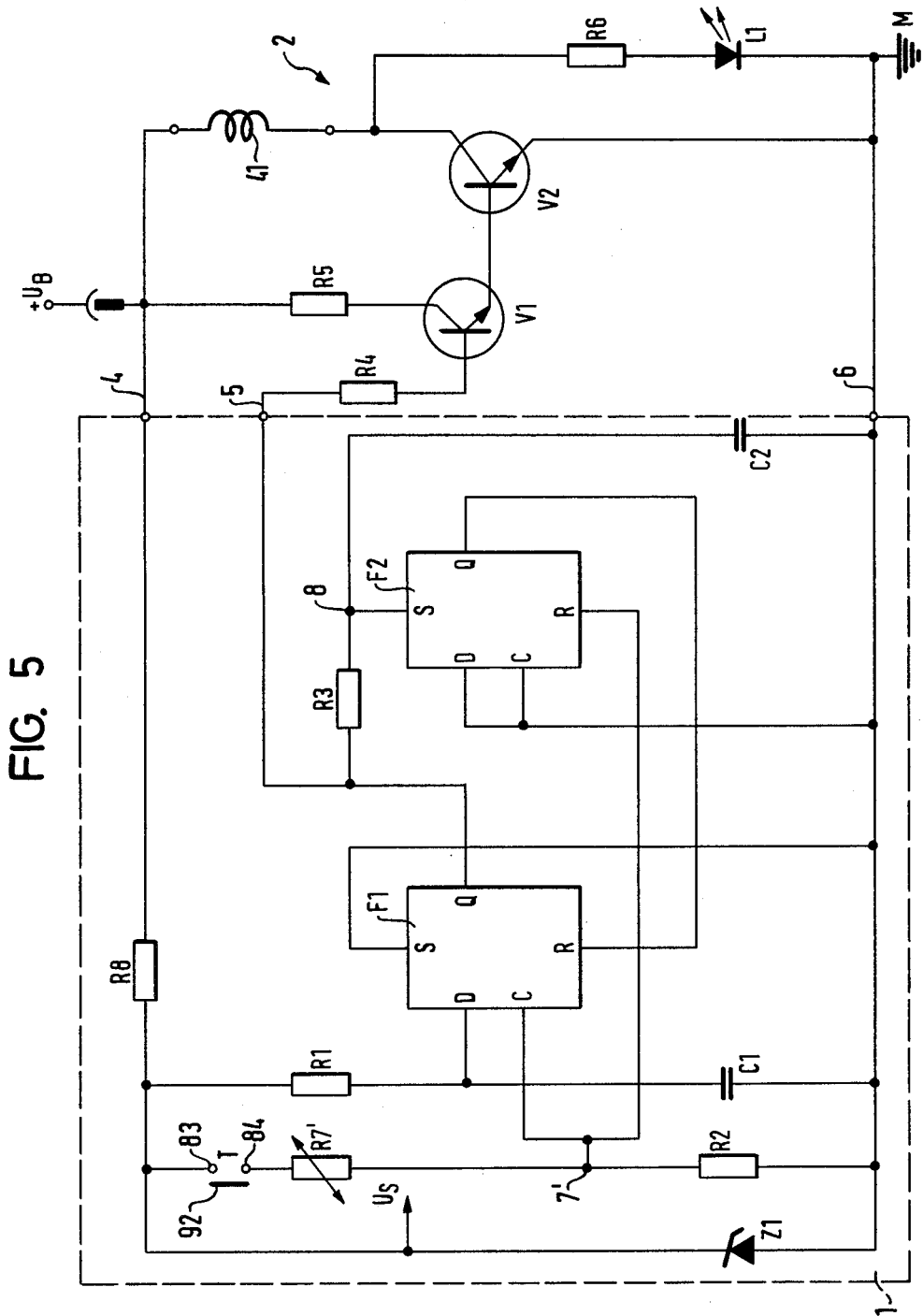
FIG. 5 is a schematic circuit diagram of a third embodiment of the timing circuit and a second embodiment of the driver circuit.

A further, particularly preferred variant of the electronic control circuit according to the invention is once again illustrated completely in FIG. 5. Since the greatest part of the components of this embodiment corresponds to the components in the embodiment according to FIG. 3, the same reference symbols were used as far as possible. Components, which possess a similar, but not identical function as in the embodiment according to FIG. 3, are characterized with the same reference symbol, however provided with a prime (').

Because of the far-reaching similarity with the example of embodiment according to FIG. 3, only the differences of the embodiment of FIG. 5 will be explained in the following. For the remainder, what has been said in connection with FIG. 3 applies in the appropriate sense.

A first difference from the timing circuit 1 illustrated in FIG. 3 consists in placing the resistor R1 and the key switch T with their connections to the current supply side, not in front, but behind the resistor R8. In this way they are not acted on by the battery voltage $U_B$ appearing on the line 4 and subject to fluctuation, but by the supply voltage $U_S$ stabilized by the Zener diode Z1. This affords the advantage that no dangerous over-voltages and no disturbing voltage peaks can get to the flip-flop inputs connected with the other side of the resistor R1 or of the key switch T.

Furthermore, a PTC resistor R7' which serves to protect against overheating is connected between the key switch T and the resistor R2 and the branching point 7', from which leads extend to the control inputs C and R of the flip-flop F1 and F2, respectively. The point 7' lies between the resistors R2 and R7' which are arranged in series. It is thereby attained that, when a predetermined temperature is exceeded, the potential appearing at point 7', on the closing of the key switch T, is no longer sufficient for the triggering or setting of the flip-flop F1 since, by reason of the then very high resistance value of R7', the driver circuit 2 cannot be switched on.

Here, rather than for the example of embodiment according to FIG. 3, on a predetermined temperature being exceeded, the switching of the driver transistor V1 and thereby the closing of the power switch V2 is prevented not directly, but indirectly since the timing circuit 1 is made insensitive to an actuation of the key switch T.

It is possible in a not illustrated embodiment to connect, for example, a PTC resistor in series with a second resistor and the voltage divider thus formed placed between the supply voltage and ground. The junction of both of the resistors can then be connected with the D-input of the flip-flop F1 as represented in FIG. 3. Through a suitable choice of resistance values of both the resistors, any desired predetermined temperature for example at 60° C. or 70° C., can be set. When the set temperature is exceeded the resistance value of the PTC resistor changes to three decades so that a logic 0 appears in place of the logic 1, present at the data input of the flip-flop, resistor so that no logic 1 can appear at the Q-output of this flip-flop through actuation of the key switch T. Rather, the logic 0, which is present in any case when the flip-flop is reset, is maintained and the driver circuit is not driven. Therefore, the coil 41 receives no heater current. Only when the temperature at the PTC resistor has dropped below the predetermined critical value, is a logic 1 applied to the data input of the flip-flop and then taken over at the Q-output on actuation of the key switch T.

It is possible to provide a similar circuit arrangement in combination with the timing circuit illustrated in FIG. 4 and built with monoflops. Here, the CD-input of the monoflop M1 would then be blocked by an appropriately built-up voltage divider. By reason of this different kind of the temperature monitoring, the PTC resistor R7 can then be omitted in the driver circuit 2. This permits, when a pnp Darlington power transistor is used as power switch V2, the omission entirely of a driver transistor V2. The Darlington stage is driven directly by the $\overline{Q}$-output of the flip-flop F1 or of the monoflop M1, respectively.

The driver circuit 2 according to FIG. 5 differs in addition from that according to FIG. 3 in that no pnp, but npn components are used in it as driver transistor V1 and as power transistor V2.

This has the consequence on the one hand that the driving line 2 is no longer applied to the $\overline{Q}$-output, but together with the RC-member R3 and C2 to the Q-output of the flip-flop F1. On the other hand, the resistor R5 is now no longer an emitter resistance, but a collector resistance of the driver transistor V1. The coil 41 is no longer connected between the power switch V2 and ground, but between the power switch V2 and the positive supply voltage $U_B$, while conversely the luminescent diode L1 with its current limiting resistor R6 now lies between the junction of the power switch V2 and the coil 41 and ground. The function of this driver circuit 2 is the same as the driver circuit illustrated in FIG. 3.

According to another not illustrated embodiment, the electronic control circuit can also comprise a regulating circuit which with the aid of a measuring sensor monitors the temperature of the incandescent element and after attainment of a predetermined value assures that this value is kept constant for a predetermined period of time of, for example, 20 seconds. In this case, the luminescent diode indicating the operational state would again have to light up at the instant, in which the heating element has attained the predetermined temperature in order to indicate to the user that he can now take the plug out of the socket. This arrangement has the great advantage that the user does not have to take the cigar lighter out immediately after lighting-up of the luminescent diode, from which he may in some circumstances be prevented, for example by the instantaneous travel situation. Instead, the heating element is held hot for him over a longer time in a state ready for lighting, whereby the operating comfort increases appreciably.

Beyond that, this regulating circuit can advantageously be so extended that, on exceeding the predetermined time interval, it regulates the temperature of the heating element down according to a predetermined time program and thus serves as effective protection against over-heating.

We claim:

1. A cigar lighter for vehicles and the like comprising a cylindrical socket having a pair of terminals connected to a source of electrical current, and a lighter plug axially insertable into said socket, said plug comprising a cylindrical body having a heating element fixedly mounted at its front end, a knob fixedly mounted at its rear end, a pair of contact elements connectable on insertion of said plug within said socket with respective ones of said terminals and an electronic control circuit comprising an arrangement of a driver circuit adapted to connect said source of current with said heating element, a timing circuit connected to said driver circuit and operable to trigger said driver circuit for a predetermined period of time and thereafter to block said driver circuit for a second predetermined period of time, and switch means mounted on said knob for actuating said timing circuit.

2. The cigar lighter according to claim 1, wherein said plug body comprises two metallic sleeves axially arranged one behind the other insulated one from the other and the socket comprises two metallic hollow cylinder sections axially arranged one behind the other and electrically insulated one from the other, each section forming the respective terminals of the source of current, the internal diameter of said sections conforming to the external diameter of the associated sleeves to provide electrical contact between the plug body and socket when inserted.

3. The cigar lighter according to claim 2, wherein said heating element comprises a coil insulatingly set with a metallic cup, said coil having one end electrically connected to said cup, and the forward sleeve of said plug body is open at its front end and extends forwardly beyond the frontal plane of the cup, said sleeve being in conducting connection with the cup, when said plug body is inserted in said socket.

4. The cigar lighter according to claim 3, wherein the forward sleeve is provided, at least in its region protruding beyond the front plane of the cup with a plurality of axial notches extending rearwardly from their front rim, thereby forming a plurality of resilient prongs separated one from the other at their tips and connected one with the other at their bases.

5. The cigar lighter according to claim 4, wherein at least one of the resilient prongs is provided on its inner surface with a projection adapted to engage the surface of said cup.

6. The cigar lighter according to claim 2 wherein the forward sleeve is provided at is rear end with a bottom wall, bent at right angles radially inwards and having a central opening, a retaining pin passing through said central opening and insulatingly through the bottom of said cup into contact with the other end of said coil, said pin projecting rearwardly from the bottom wall into plug body.

7. The cigar lighter according to claim 6, including a first annular washer of heat-insulating material inserted between the bottom wall of the forward sleeve and the bottom of the cup.

8. The cigar lighter according to claim 7, including a carrier fixedly mounted within the rear sleeve, said carrier having a central bore through which said retaining pin passes.

9. The cigar lighter according to claim 8, wherein the carrier is formed of synthetic material and spacer means of a heat-insulating material is inserted between the carrier and the bottom wall of the forward sleeve.

10. The cigar lighter according to claim 9 wherein said spacer means comprises a second and a third annular washer, said second and third washers being provided with offset shoulders standing in contact one with the other over a small contact surface.

11. The cigar lighter according to claim 10, wherein at least one of the second and third washers is formed with a contact surface having grooves or flutes for the attainment of a lowest possible heat transfer.

12. The cigar lighter according to claim 11, wherein said retaining pin is threaded and said first, second and third washers, said forward sleeve, and said carrier are clamped held together by a nut screwed onto that end of the retaining pin.

13. The cigar lighter according to claim 12, including a contact ring clamped between the nut and the carrier, for connection to said electronic control circuit.

14. The cigar lighter according to claim 13 wherein the carrier is fastened in the rearward sleeve by at least one detent connection.

15. The cigar lighter according to claim 13, including a luminescent diode actuable through the electronic control circuit for indicating the operational state of said cigar lighter.

16. The cigar lighter according to claim 1, wherein the knob is provided with a central bore, into which the luminescent diode seats so as to be visible from the rear end face of the knob.

17. The cigar lighter according to claim 16, wherein the switch means comprises a key switch.

18. The cigar lighter according to claim 17, wherein the key switch is located at the rear end face of the knob.

19. The cigar lighter according to claim 18, wherein the key switches comprises two switch contacts which are arranged at the rear end face of the knob in conducting connection with the inputs of the electronic control circuit and which are releasably connectable one with the other by a manually pressable electrically conducting elastomeric contactor.

20. The cigar lighter according to claim 19, wherein the switch contacts are two circular metal strips or wires inserted in grooves formed in the end face of said knob, projecting slightly beyond the end face and arranged concentrically with the luminescent diode.

21. The cigar lighter according to claim 20, wherein said electrically conducting elastomeric contactor is a circular disc inserted in a depression of the end face of the knob and is provided with a central passage for the luminescent diode.

22. The cigar lighter according to claim 1 wherein the knob is fastened to the rearward sleeve by at least one detent connection.

23. The cigar lighter according to claim 22, wherein the knob is fastened to the rearward sleeve and is at least in part hollow, said electronic control circuit being mounted on a circuit board located at least in part within said knob and said rearward sleeve.

24. The cigar lighter according to claim 1, wherein the timing circuit comprises a first flip-flop, settable through actuation of said switch, said flip-flop controlling the driver circuit, and RC-member charged by said first flip-flop and a second flip-flop connected to said first flip-flop and said RC-member, said second flip-flop being settable when the charge on the capacitor of said RC-member exceeds a predetermined value and thereby resetting said first flip-flop.

25. The cigar lighter according to claim 1, wherein the timing circuit comprises a first monoflop settable through actuation of the switch, said first monoflop controlling the driver circuit, a second monoflop connected to said first monoflop and settable thereby, an output of the second monoflop being connected with a blocking input of the first monoflop.

26. The cigar lighter according to claims 24 or 25 wherein the timing circuit includes a second RC-member adapted to place the control circuit into a defined rest state on the application of a current supply thereto.

27. The cigar lighter according to claim 1 wherein the driver circuit comprises a transistor and an electronic switch driven thereby and wherein the electronic switch and the heating element are connected serially between both the current supply terminals.

28. The cigar lighter according to claim 27 wherein the electronic switch is a Darlington power transistor or a V-MOS transistor.

29. The cigar lighter according to claim 28 including a heat-dependent element connected in series with the collector-emitter path of the driver transistor, for monitoring the temperature and blocking the driver transistor on reaching a predetermined temperature.

30. The cigar lighter according to claim 29 wherein the heat-dependent element is a PTC or NTC resistor.

31. The cigar lighter according to 28 wherein the luminescent diode is connected across the switching path of the electronic switch.

32. The cigar lighter according to claim 28 including a heat-dependent element connected in series with said key switch for monitoring the temperature and on reaching a predetermined temperature blocking the triggering of the timing circuit.

33. The cigar lighter according to claim 32, wherein the heat-dependent element is a PTC or NTC resistor, and includes a second resistor forming a voltage divider, said heat-dependent element and said voltage divider being placed between the key switch and ground, and a clock input of the first flip-flop, and the resetting input of the second flip-flop or the trigger input of the first monoflop, which serves to trigger the first monoflop, are connected with a tap of the voltage divider.

34. The cigar lighter according to claim 23 wherein the circuit board is mounted on a bracket secured to said rear ward sleeve said bracket being constructed to provide cooling body for the electronic switch.

35. The cigar lighter according to claim 34 wherein the luminescent diode is fixedly mounted on the circuit board.

36. The cigar lighter according to one of the claim 1, including two spring elements protruding forwardly out of the knob, said spring elements being in conducting connection with a respective one of both the contacts of the key switch and in engagement with a respective corresponding contact dot of the circuit board.

37. The cigar lighter according to claim 36 wherein one current supply contact dot of the circuit board is in conducting connection through the bracket with the rearward sleeve of the plug body and the other current supply contact dot is in conducting connection through an electrical conductor which extends through a bore of the carrier with the forward sleeve of the plug body.

38. The cigar lighter according to claim 27, wherein the electronic switch is mounted in the interior of the plug body separately from the circuit board and is connected through conductors with a corresponding terminal on the circuit board with one of the current supply terminals and with one of the current contacts of the heating elements.

39. The cigar lighter according to claim 1 wherein the electronic control circuit comprises a regulating circuit which monitors the temperature with the aid of a measuring sensor and, after attainment of a predetermined value, holds the temperature at this predetermined value for a predetermined time.

40. The cigar lighter according to claim 39, wherein the regulating circuit, on exceeding the predetermined time causes the decrease in temperature of the heating element to a lower value.

* * * * *